(12) United States Patent
Chen

(10) Patent No.: US 9,231,851 B2
(45) Date of Patent: Jan. 5, 2016

(54) SYSTEM AND METHOD FOR COMPUTING POINT-TO-POINT LABEL SWITCHED PATH CROSSING MULTIPLE DOMAINS

(75) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 974 days.

(21) Appl. No.: 13/349,145

(22) Filed: Jan. 12, 2012

(65) Prior Publication Data
US 2012/0195229 A1    Aug. 2, 2012

Related U.S. Application Data

(60) Provisional application No. 61/438,010, filed on Jan. 31, 2011.

(51) Int. Cl.
*H04L 12/28*  (2006.01)
*H04L 12/715* (2013.01)
*H04L 12/721* (2013.01)

(52) U.S. Cl.
CPC ............. *H04L 45/04* (2013.01); *H04L 45/12* (2013.01)

(58) Field of Classification Search
CPC ........ H04L 45/04; H04L 45/12; H04W 92/02
See application file for complete search history.

(56) References Cited

U.S. PATENT DOCUMENTS

| | | | |
|---|---|---|---|
| 2004/0073702 A1* | 4/2004 | Rong | 709/241 |
| 2005/0190704 A1* | 9/2005 | Zhang et al. | 370/254 |
| 2006/0171320 A1* | 8/2006 | Vasseur et al. | 370/238 |
| 2006/0200579 A1 | 9/2006 | Vasseur et al. | |
| 2007/0165515 A1* | 7/2007 | Vasseur | 370/216 |
| 2007/0217419 A1* | 9/2007 | Vasseur | 370/392 |
| 2008/0112325 A1* | 5/2008 | Sivakumar et al. | 370/238 |
| 2008/0279101 A1* | 11/2008 | Wu et al. | 370/235 |
| 2009/0135824 A1* | 5/2009 | Liu | 370/392 |
| 2010/0039939 A1 | 2/2010 | Wang | |
| 2011/0019674 A1 | 1/2011 | Iovanna et al. | |
| 2012/0102228 A1* | 4/2012 | Cugini et al. | 709/242 |
| 2012/0163390 A1* | 6/2012 | Iovanna et al. | 370/400 |
| 2013/0007266 A1* | 1/2013 | Jocha et al. | 709/224 |

FOREIGN PATENT DOCUMENTS

| | | |
|---|---|---|
| CN | 101133408 A | 2/2008 |
| CN | 101163105 A | 4/2008 |

OTHER PUBLICATIONS

Vasseur, et al., "Path Computation Element (PCE) Communication Protocol (PCEP)," RFC 5440, Mar. 2009.
(Continued)

*Primary Examiner* — Hoang-Chuong Vu
(74) *Attorney, Agent, or Firm* — Conley Rose, P.C.; Grant Rodolph; William H. Dietrich

(57) ABSTRACT

Disclosed is an apparatus comprising a plurality of path computation elements (PCEs) associated with a plurality of inter-coupled domains and configured to communicate with a path computation client (PCC) associated with one of the domains and to implement a Forward Search Path Computation (FSPC) for a preferred path crossing the domains from a source node in a source domain of the plurality of inter-coupled domains to a destination node in a destination domain of the plurality of inter-coupled domains, wherein the preferred path is computed without using a determined order of the domains from the source domain to the destination domain.

23 Claims, 9 Drawing Sheets

(56) References Cited

OTHER PUBLICATIONS

Vasseur, et al., "A Backward-Recursive PCE-Based Computation (BRPC) Procedure to Compute Shortest Constrained Inter-Domain Traffic Engineering Label Switched Paths," RFC 5441, Apr. 2009.
Foreign Communication From a Counterpart Application, European Application No. 12742053.7, Extended European Search Report dated Nov. 5, 2013, 9 pages.
Chen, H., "A Fordward-Search P2P TE LSP Inter-Domain Path Computation," draft-chen-pce-forward-search-p2p-path-computation-00.txt, XP015074335, Mar. 7, 2011, 13 pages.
Vasseur, JP., Ed., et al., "A Per-Domain Path Computation Method for Establishing Inter-Domain Traffic Engineering (TE) Label Switched Paths (LSPs)," RFC 5152, XP015055222, Feb. 2008, 21 pages.
Vasseur, JP., Ed., et al., "A Backward-Recursive PCE-Based Computation (BRPC) Procedure to Compute Shortest Constrained Inter-Domain Traffic Engineering Label Switched Paths," RFC 5441, XP015065553, Apr. 2009, 18 pages.
Foreign Communication From a Realted Counterpart Application, PCT Application PCT/CN2012/070797, International Search Report dated May 3, 2012, 3 pages.
Foreign Communication From a Realted Counterpart Application, PCT Application PCT/CN2012/070797, Written Opinion dated May 3, 2012, 7 pages.
Bradner, "Key Words for Use in RFCs to Indicate Requirement Levels," RFC 2119, Mar. 1997, 3 pages.
Awduche, et al, "RSVP-TE: Extensions to RSVP for LSP Tunnels," RFC 3209, Dec. 2001, 57 pages.
Eastlake, III, "Transport Layer Security (TLS) Extensions: Extension Definitions," RFC 6066, Jan. 2011, 25 pages.
Farrel, et al., "A Path Computation Element (PCE)—Based Architecture," RFC 4655, Aug. 2006, 38 pages.
Yasukawa, et al., "Path Computation Clients (PCC)—Path Computation Element (PCE) Requirements for Point-to-Multipoint MPLS-TE," RFC 5862, Jun. 2010, 11 pages.
Le Roux, Ed., et al., "Requirements for Inter-Area MPLS Traffic Engineering," RFC 4105, Jun. 2005, 21 pages.
Zhang., Ed., et al., "MPLS Inter-Autonomous System (AS) Traffic Engineering (TE) Requirements," RFC 4216, Nov. 2005, 28 pages.
Yasukawa, et al., "Applicability of the Path Computation Element (PCE) to Point-to-Multipoint (P2MP) MPLS and GMPLS Traffic Engineering (TE)," RFC 5671, Oct. 2009, 16 pages.
Zhao, et al., "PCE-Based Computation Procedure to Compute Shortest Constrained P2MP Inter-domain Traffic Engineering Label Switched Paths," draft-ietf-pce-pcep-inter-domain-p2mp-procedures-01, Oct. 28, 2011, 26 pages.
Zhao, et al., "PCE-Based Computation Procedure to Compute Shortest Constrained P2MP Inter-domain Traffic Engineering Label Switched Paths," draft-zhao-pce-pcep-inter-domain-p2mp-procedures-06, Oct. 25, 2010, 19 pages.
Chen, et al., "A Foward-Search P2P TE LSP Inter-Domain Path Computation," draft-chen-pce-forward-search-p2p-path-computation-02, Oct. 30, 2011, 14 pages.

* cited by examiner

FIG. 3

SYSTEM AND METHOD FOR COMPUTING POINT-TO-POINT LABEL SWITCHED PATH CROSSING MULTIPLE DOMAINS

CROSS-REFERENCE TO RELATED APPLICATIONS

The present application claims the benefit of U.S. Provisional Patent Application No. 61/438,010 filed Jan. 31, 2011 by Huaimo Chen and entitled "System and Method for Computing Point-to-Point Label Switched Path Crossing Multiple Domains," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In some networks, such as Multiprotocol Label Switching (MPLS) networks and Generalized MPLS (GMPLS) networks, a Traffic Engineering (TE) Label Switched Path (LSP) can be established using a Resource Reservation Protocol-TE (RSVP-TE) for a given path. A path can be provided by a Path Computation Client (PCC) and/or a Path Computation Element (PCE). For example, the PCC may request a path or route from the PCE, which computes the path and forwards the computed path information back to the PCC. The path can be a point-to-point (P2P) path, which comprises a plurality of nodes and/or Label Switch Routers (LSRs) and extends from a source node or LSR to a destination node or LSR. Alternatively, the path can be a Point-to-Multipoint (P2MP) path that extends from the source node to a plurality of destination nodes. The RSVP-TE can also be used to establish backup P2P and P2MP LSPs to reroute packets during network link or internal node failures and thus guarantee packet delivery.

SUMMARY

In one embodiment, the disclosure includes an apparatus comprising a plurality of path computation elements (PCEs) associated with a plurality of inter-coupled domains and configured to communicate with a path computation client (PCC) associated with one of the domains and to implement a Forward Search Path Computation (FSPC) for a preferred path crossing the domains from a source node in a source domain of the plurality of inter-coupled domains to a destination node in a destination domain of the plurality of inter-coupled domains, wherein the preferred path is computed without using a determined order of the domains from the source domain to the destination domain.

In another embodiment, the disclosure includes a network component comprising a receiver configured to receive a request for computing a path from a source node in a source domain to a destination node in a destination domain coupled to the source domain and to receive a reply containing a path computation result, a logic unit configured to compute a plurality of temporary paths across a current domain, update a candidate path list with the temporary paths, and update a result path list with a minimum cost path selected from the updated candidate path list, and a transmitter configured to send a message to complete the request for computing the path from the source node to the destination node and send a reply message to pass the path computation result.

In a third aspect, the disclosure includes a method implemented by a path computation element (PCE) comprising receiving in a current domain a request to compute a path for a point-to-point (P2P) Label Switched Path (LSP) from a source node to a destination node crossing multiple domains that include the current domain, attempting to compute, with at least one processor, one or more temporary paths in the current domain, updating a candidate path list using the temporary paths if computed successfully, updating a result path list with a minimum cost path selected from the candidate path list as a working path, and returning a reply to respond to the request.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a schematic diagram of another embodiment of a FSPC scheme.

DETAILED DESCRIPTION

Figure 1:
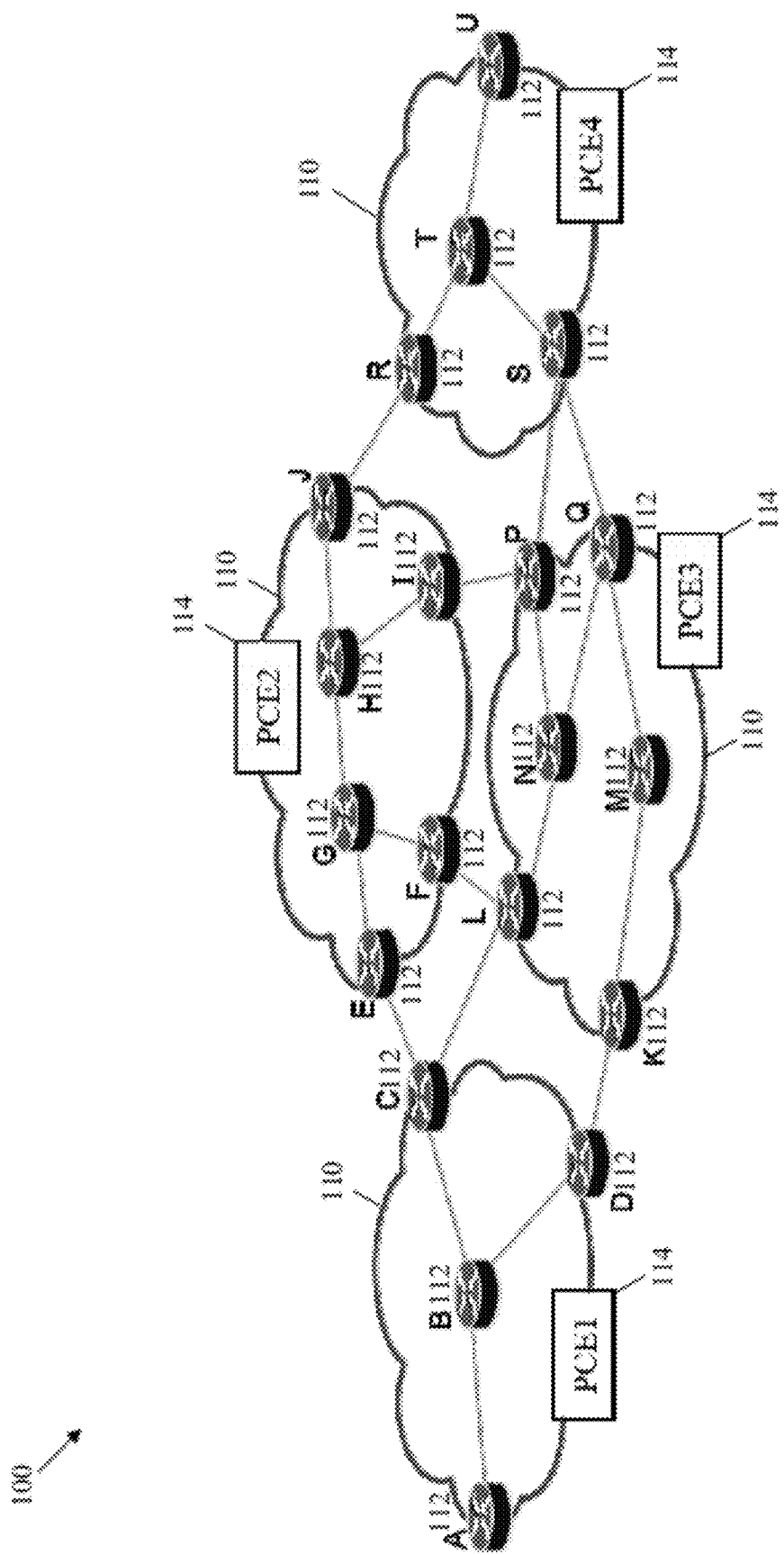
FIG. 1 is a schematic diagram of an embodiment of a label switched system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some networks, such as MPLS networks, a TE LSP may be established using a RSVP-TE for a path. A path may be computed by a PCC and a PCE. The PCC may request a path or route from the PCE, which may compute the path and send the computed path information back to the PCC. The path may be a P2P path that extends from a source node to a destination node and that crosses a plurality of domains. Each domain may comprise a plurality of network elements within a common sphere of address management and/or a common path computational responsibility, such as an Interior Gateway Protocol (IGP) area or an Autonomous System.

The Internet Engineering Task Force (IETF) Request for Comments (RFC) 5441, entitled "A Backward Recursive PCE-based Computation (BRPC) procedure to compute shortest inter-domain Traffic Engineering Label Switched Paths," published in http://ietfreportisoc.org/rfc/rfc5441.txt, and incorporated herein by reference, describes a procedure to compute a shortest path for a MPLS TE P2P LSP across a determined sequence of domains. The procedure relies on the use of multiple PCEs to compute the shortest path for the MPLS TE P2P LSP across the determined sequence of domains, using a backward-recursive path computation (BRPC) technique.

The BRPC procedure may suffer from a plurality of issues for computing a path for a MPLS TE P2P LSP crossing a plurality of domains. The issues include a required knowledge of the sequence of domains from the source to the destination and a complexity of navigating a mesh of domains. Additionally, the BRPC procedure may not provide the optimal or shortest path if the path is not in the sequence of domains from the source to the destination. Thus, the BRPC procedure may not guarantee that the computed path crossing multiple domains is optimal.

Disclosed herein is a system and method for computing a path for a MPLS TE P2P LSP that crosses a plurality of domains. The system may include extensions to a Path Computation Element communication Protocol (PCEP). The method may resolve current issues for computing paths across multiple domains, such as the issues of the BRPC procedure described above. The method may guarantee that the computed path from the source to the destination is optimal and may not depend on a determined sequence of domains from the source to the destination. The method may also guarantee navigating a mesh of domains with reduced complexity and improved efficiency, e.g., in comparison to the BRPC procedure.

FIG. 1 illustrates an embodiment of a label switched system 100, where a plurality of P2P LSPs may be established between at least some of the components. The P2P LSPs may be used to transport data traffic. The label switched system 100 may comprise a plurality of domains 110, such as IGP areas and/or Autonomous Systems. Each domain 110 may comprise a plurality of nodes 112 and optionally a PCE 114. The domains 110 may correspond to a packet switched network that transports data traffic using packets or frames along network paths or routes. The packets may be routed or switched along the network paths, which may be established by a label switching protocol, such as MPLS or GMPLS.

The nodes 112 may comprise edge nodes and internal nodes, which may comprise routers (e.g., LSRs), switches, bridges, any other network components configured to transfer network traffic, or combinations thereof. The edge nodes and internal nodes may receive packets from other network nodes, comprise logic circuitry that determines which network nodes to send the packets to, and transmit the packets to the other network nodes. In some embodiments, at least some of the internal nodes may be LSRs that are configured to modify or update the labels of the packets transported in a label switched network. Further, at least some of the edge nodes may be label edge routers (LERs) that are configured to insert or remove the labels of the packets transported between the label switched network and an external network.

The domains 110 may be coupled to each other via at least some of the nodes 112, which may be edge or boundary nodes. The nodes 112 shown in FIG. 1 across the multiple domains 110 are labeled from A to U. For example a first domain 110 may comprise the nodes A, B, C, and D. A second domain 110 coupled to the first domain 110 may comprise the nodes E, F, G, H, I, and J. Node C in the first domain 110 may be coupled (via a link) to node E in the second domain 110. A third domain 110 also coupled to the first domain 110 may comprise the nodes K, L, M, N, P, and Q. Nodes C and D in the first domain 110 may be coupled (via corresponding links) to nodes L and K in the third domain 110, respectively. A fourth domain 110 coupled to the second domain 110 and the third domain 110 may comprise the nodes R, S, T, and U. Node J in the second domain 110 may be coupled (via a link) to node R in the fourth domain 110.

The PCEs 114 may be configured to compute a path for a P2P LSP crossing the domains 110. Each PCE 114 may compute a plurality of candidate or possible sub-paths in a corresponding domain 110. The PCEs 114 shown in FIG. 1 and labeled PGE1, PGE2, PCE3, and PCE4 correspond to the first, second, third, and fourth domains 110, respectively. The PCEs 114 may also be configured to communicate with each other to select the portions of the path for the P2P LSP in the domains 110 to provide an optimal or shortest path for the P2P LSP across the domains using a FSPC scheme, as described in detail below. For instance, the optimal or shortest path may be a minimum cost path across the domains 110 and that comprises appropriate sub-paths in the domains 110. At least one of the PCEs 114 may be configured to communicate with a PCC (not shown) and receive from the PCC a request to compute a path for the P2P LSP across the domains 110. The request may indicate the source node 112 and the destination node 112 for the path for the P2P LSP, which may be located in different domains 110. The PCEs 114 may compute the path independent of the order or sequence of domains 110 from the source node 112 to the destination node 112. Accordingly, the PCC may indicate to the PCE 114 the domains 110 without determining a sequence of the domains 110.

Figure 2:
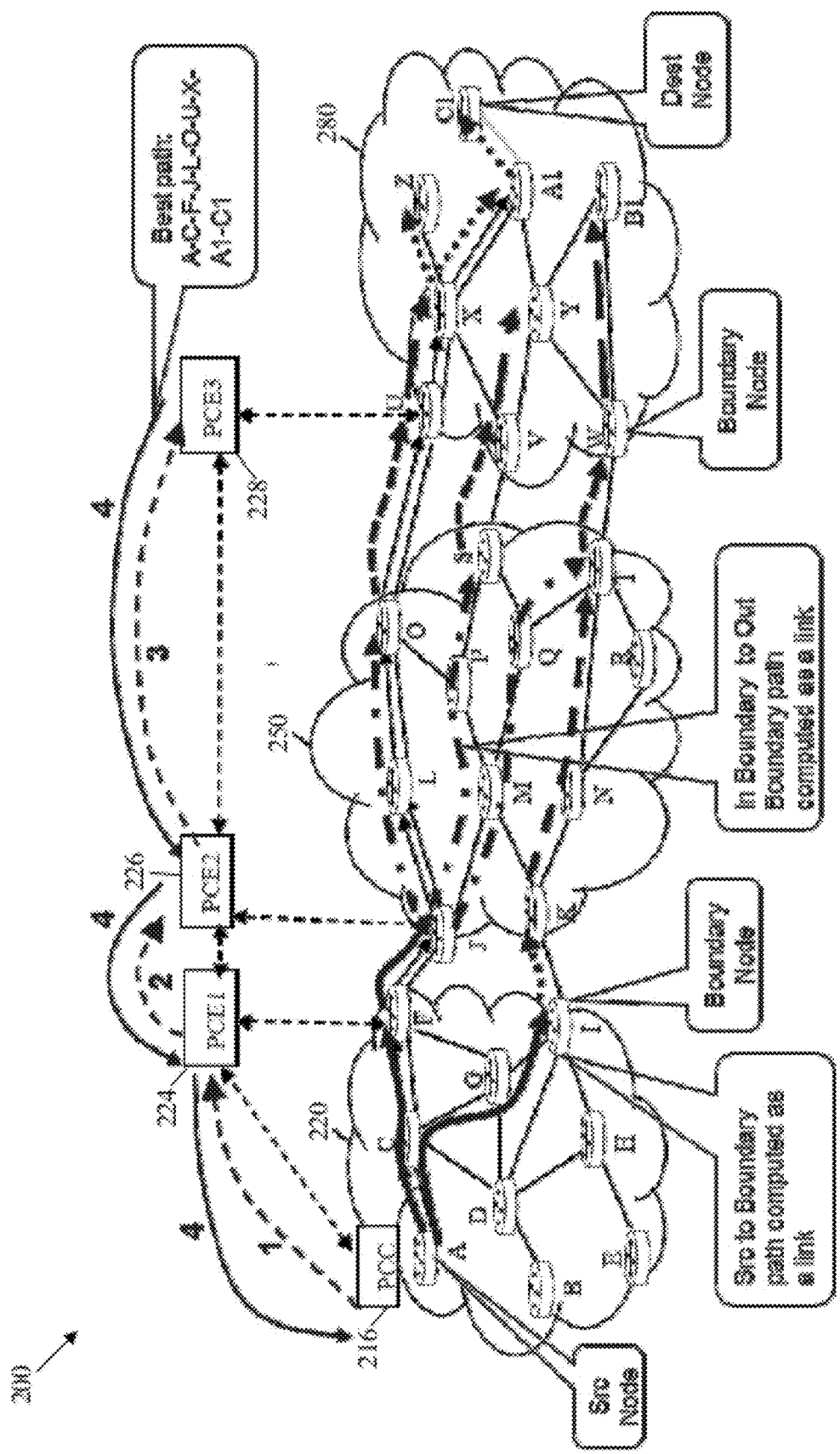
FIG. 2 is a schematic diagram of an embodiment of a FSPC scheme.

FIG. 2 illustrates an embodiment of a FSPC scheme 200 for computing a P2P inter-domain path, which may be established in a network or a label switched system of multiple domains, e.g., similar to the label switched system 100. The network may comprise a first domain 220, a second domain 250, and a third domain 280, e.g., similar to the domains 110. The first domain 220, second domain 250, and third domain 280 may comprise a plurality of nodes, e.g., similar to the nodes 112. The network may also comprise a first PCE 224 (PCE1), a second PCE 226 (PCE2), and a third PCE 228 (PCE3) that may be associated with the first domain 220, the second domain 250, and the third domain 280, respectively. The network may also comprise one or more PCCs 216 that may be distributed across the different domains. The PCC 216 may be an entity of any of the nodes in the domains (e.g., routers, bridges, and/or switches) or may be a separate entity. The PCE1, PCE2, and PCE3 at the different domains may communicate with each other and with the PCC 216.

The first domain 220 may comprise the nodes A, B, C, D, E, F, G, H, and I. The second domain 250 may comprise the nodes J, K, L, M, N, O, P, Q, R, S, and T. The third domain 280 may comprise the nodes U, V, W, X, Y, Z, A1, B1, and C1. The different domains may be coupled to each other via at least some of the nodes, as shown in FIG. 1. The nodes F and I in the first domain 220 may be exit boundary (or edge) nodes coupled to the nodes J and K in the second domain 250, respectively. The nodes J and K may also be entry or incoming boundary nodes of the second domain 250. The nodes O, S, and T in the second domain 250 may be exit boundary nodes coupled to the nodes U, V, and W in the third domain 280, respectively. The nodes U, V, and W may also be entry or incoming boundary nodes of the third domain 280.

The FSPC procedure may start at a source domain in which the source (or ingress) node of the MPLS TE P2P LSP is located. When a source PCE in or associated with the source domain receives (from a PCC in or associated with the source domain) a request for the path for the MPLS TE P2P LSP, the source PCE may compute one or more paths from the source node to each exit (or egress) boundary node of the domain towards the destination node. The source PCE may also extend each computed path with a link from the path's tail-end (or egress boundary) node to an entry or ingress boundary node in another domain coupled to the source domain.

The computed paths may be temporary optimal paths, which may be maintained (e.g., by any combination of PCEs and PCC or by the network) in a first path list referred to herein as a candidate path list. The candidate path list may comprise the temporary optimal paths from the source node to the boundary nodes (or nodes in the destination domain) currently found. The temporary optimal paths in the candidate path list may also be ordered by the cost of the paths. The cost may include any measure of resources needed to establish the path, such as the number of next-hop nodes, the number of links, the bandwidth, the time delay, other associated resources, or combinations thereof. Initially, the candidate path list may comprise only the source node with a cost of about zero. The temporary optimal paths found in the source domain may then be added to the initial candidate path list. Additionally, a second path list referred to herein as a result path list or tree may be maintained (by any combination of PCEs and PCC or by the network). The result path list may comprise the optimal path(s) with minimum cost from the source node to the boundary nodes (or the nodes in the destination domain), which may be selected from the candidate path list. Initially, the result path list may be empty. The path with the minimum cost from the candidate path list may be added to or updated in the result path list, as temporary optimal path are computed across the domains. The result path list may comprise more than one path that have about the same cost and the same tail-end node.

For instance, a PCC 216 in the first domain 220 may send a request to PCE1 to compute a path for a P2P LSP from the source node A in the first domain 220 to the destination node C1 in the third domain 280. PCE1 may then compute a temporary optimal path from node A to each of the two boundary nodes F and I of the first domain 220. The two paths may comprise the path crossing the nodes A, C, and F and the path crossing the nodes A, C, G, and I, which are shown as solid arrow lines in FIG. 2. The two paths may then be extended to connect the boundary nodes F and I to the entry boundary nodes J and K, respectively, in the second domain 250. The two temporary optimal paths and their costs may then be added to the candidate path list. The two temporary optimal paths may also be ordered in the candidate path list based on their cost. PCE1 may then select the path with the minimum cost from the candidate path list and add the selected path to the result path list. Ordering the paths in the candidate path list according to their cost may facilitate searching for the minimum cost path. For example, the minimum cost path may be ordered as the first path in the candidate path list.

After computing the candidate optimal paths in the source domain, each PCE responsible for each domain subsequent to the source domain (referred to herein as a current or intermediate domain) and leading to the destination domain may receive a request for computing the path for the MPLS TE P2P LSP. The request may be sent to the current PCE from a preceding PCE in a preceding intermediate domain or the source domain or from the PCC of the source domain. The request may also comprise the candidate path list and the result path list or may indicate the paths in the candidate path list and the result path list. The current PCE may then compute a plurality of paths from each entry or ingress boundary node in the current domain, which may be part of the previously computed paths, to an exit or egress boundary node of the current domain. The current PCE may also extend each computed path with a link from the path's exit or egress boundary node to an entry or ingress node in another domain coupled to the current domain.

The temporary optimal temporary paths in the candidate path list may then be updated to include all combinations of the computed paths from the source node to the boundary nodes of the current domain. This may require extending the optimal temporary paths in the candidate path list with the paths computed in the current domain. The updated temporary optimal path may then be ordered based on their updated cost, and the resulting path with the minimum cost may also be updated or added in the result path list. The resulting path with the minimum cost may be added to the result path list if the minimum cost is about equal to the cost of other path(s) in the result path list.

For instance, after computing the temporary optimal paths of the first domain 220, the PCC 216 or PGE1 may send a request to PCE2 to compute the path for the P2P LSP from the source node A in the first domain 220 to the destination node C1 in the third domain 280. PCE2 may then compute four paths from the entry or ingress boundary nodes J and K of the second domain 250. The four paths may comprise the path crossing the nodes J, L, and O, the path crossing the nodes J, M, P, and S, the path crossing the nodes J, M, Q, and T, and the path crossing the nodes K, N, and T. The first three paths are shown as dotted and dashed arrow lines in FIG. 2. The fourth path is shown as dashed arrow line in FIG. 2. The four paths may also be extended to connect the boundary nodes O, S, and T to the entry boundary nodes U and V, and W, respectively, in the third domain 280. The four computed paths in the second domain 250 may then be combined with the corresponding two paths in the first domain 220 to update the temporary optimal paths in the candidate path list. The resulting four paths in the candidate path list may then comprise the path crossing the nodes, A, C, F, J, L, O, and U, the path crossing the nodes A, C, F, J, M, P, S, and V, the path crossing the nodes A, C, F, J, M, Q, T, and W, and the path crossing the nodes A, G, I, K, N, T, and W. The paths in the candidate path list may be ordered according to the costs of the combined paths and the minimum cost past may be added or updated accordingly in the result path list.

The process above may be repeated for each domain leading to the destination domain until the destination domain is reached. The destination PCE in the destination domain may receive the request to compute the path for the MPLS TE P2P LSP from a preceding PCE in a preceding domain or from the PCC of the source domain. The request may also indicate the paths in the candidate path list and the result path list. The destination PCE may then compute a plurality of paths from each entry or ingress boundary node in the destination domain, which may be part of the previously computed paths, to the destination node or to an exit or egress boundary node of the destination domain. The destination PCE may also extend each computed path that extends to an exit or egress boundary node with a link from the path's egress boundary node to an entry or ingress node in another domain coupled to the destination domain.

The temporary optimal paths in the candidate path list may then be updated to include all combinations of the computed paths from the source node to the destination node and the boundary nodes of the destination domain. The updated temporary optimal path may then be ordered based on their updated cost, and the resulting path with the minimum cost may also be updated or added in the result path list. If the resulting path with the minimum cost leads to the destination node, then the resulting path may be returned in a reply to the PCC 216 of the source domain 220 to indicate the optimal path for the requested MPLS TE P2P LSP. Otherwise, more temporary optimal paths may be computed in the remaining domains coupled to the destination domain in a similar manner until the condition above is satisfied, and the final optimal path in the result list may be returned to the PCC 216. When the FSPC procedure is completed, the last updated result path list may comprise the final optimal path for the P2P LSP with minimum cost from the source node to the destination node.

For instance, the PCC 216 or PGE2 may send a request to PCE3 to compute the path for the P2P LSP from the source node A in the first domain 220 to the destination node C1 in the third domain 280. PCE3 may then compute a plurality of paths from the entry or ingress boundary nodes U, V, and W to the destination node C1 and other nodes Z and B1. The paths may comprise the path crossing the nodes U, X, Z, the path crossing the nodes U, X, A1, and C1, and the pass crossing the nodes W and B1. The computed paths in the third domain 280 may then be combined with the corresponding previously computed paths to update the temporary optimal paths in the candidate path list. The paths in the candidate path list may be ordered according to the costs of the combined paths and the path to the destination node C1 with the minimum cost may be added or updated accordingly in the result path list and returned to the PCC 216 as the selected path.

Figure 3:
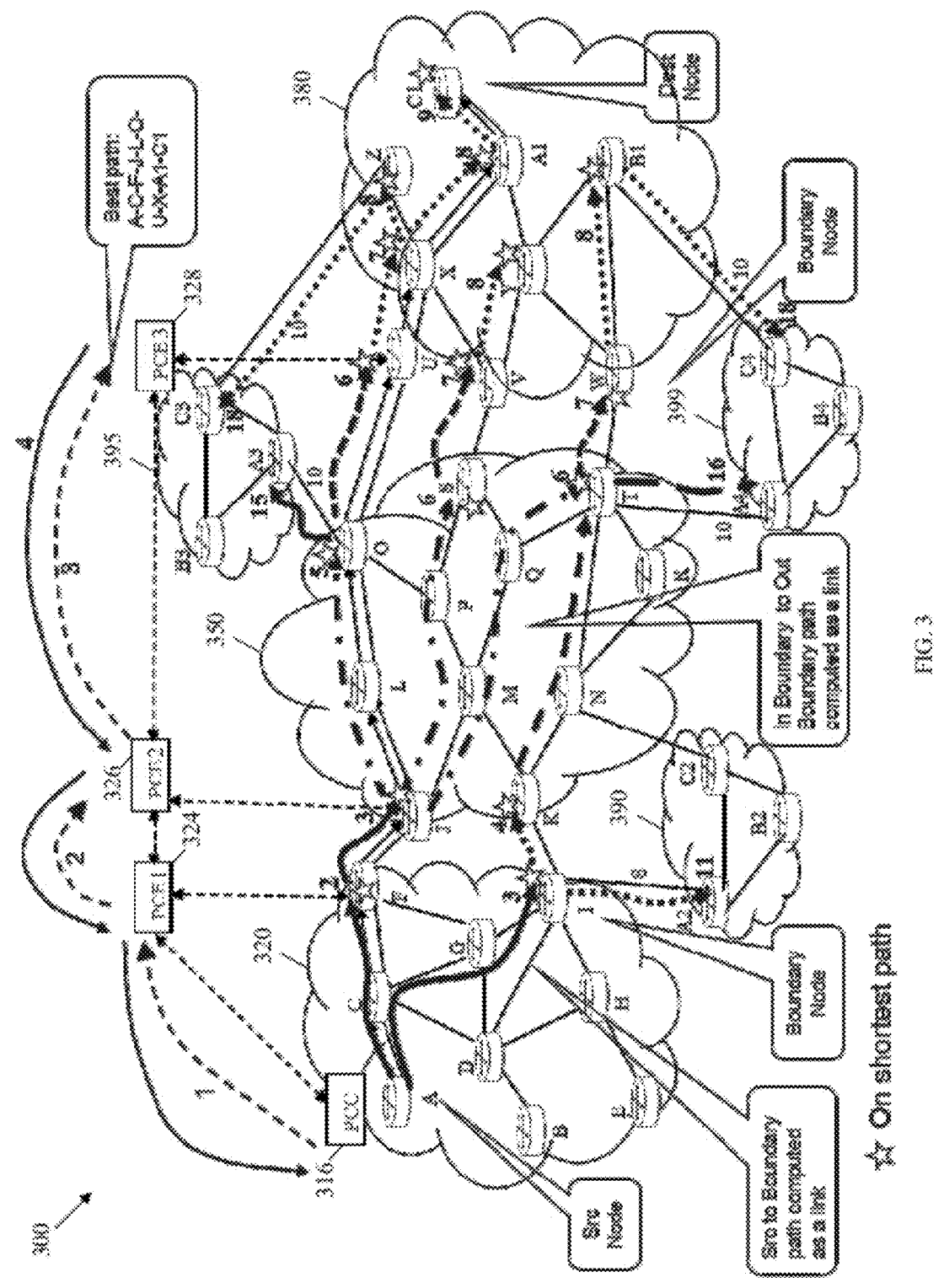

FIG. 3 illustrates another embodiment of a FSPC scheme 300 for computing a P2P inter-domain path, which may be established in a network or a label switched system of multiple domains, e.g., similar to the label switched system 100. The network may comprise a first domain 320, a second domain 350, a third domain 380, a fourth domain 390, a fifth domain 395, and a sixth domain 399, e.g., similar to the domains 110. The first domain 320, second domain 350, third domain 380, fourth domain 390, fifth domain 395, and sixth domain 399 may comprise a plurality of nodes, e.g., similar to the nodes 112. The network may also comprise a first PCE 324 (PGE1), a second PCE 326 (PGE2), and a third PCE 328 (PCE3) that may be associated with the first domain 320, the second domain 350, and the third domain 380, respectively. The fourth domain 390, fifth domain 395, and sixth domain 366 may also be associated with corresponding PCEs (not shown). The network may also comprise one or more PCCs 316 that may be distributed across the different domains. The PCC 316 may be an entity of any of the nodes in the domains or may be a separate entity. The PCEs at the different domains may communicate with each other and with the PCC 316.

The first domain 320 may comprise the nodes A, B, C, D, E, F, G, H, and I. The second domain 350 may comprise the nodes J, K, L, M, N, O, P, Q, R, S, and T. The third domain 380 may comprise the nodes U, V, W, X, Y, Z, A1, B1, and C1. The fourth domain 390 may comprise the nodes A2, B2, and C2, the fifth domain 395 may comprise the nodes A3, B3, and C3, and the sixth domain 399 may comprise the nodes A4, B4, and C4. The different domains may be coupled to each other via at least some of the nodes, as shown in FIG. 1. The nodes F and I in the first domain 320 may be boundary nodes coupled to the boundary nodes J and K in the second domain 350, respectively. The boundary nodes O, S, and T in the second domain 350 may be coupled to the boundary nodes U, V, and W in the third domain 380, respectively. The boundary nodes A2 and C2 in the fourth domain 390 may be coupled to the boundary nodes I (in the first domain 320) and N (in the second domain 350), respectively. The boundary nodes A3 and C3 in the fifth domain 395 may be coupled to the boundary nodes O (in the second domain 350) and Z (in the third domain 380), respectively. The boundary nodes A4 and C4 in the sixth domain 399 may be coupled to the boundary nodes T (in the second domain 350) and B1 (in the third domain 380), respectively.

The FSPC scheme 300 may be substantially similar to the FSPC scheme 200 and may start at the first domain 320. However, the FSPC scheme 300 is implemented in a scenario comprising more inter-coupled domains (e.g., about six domains) than the scenario of the FSPC scheme 200. A PCC 316 in the first domain 320 may send a request to PCE1 to compute a path for a P2P LSP from the source node A in the first domain 320 to the destination node C1 in the third domain 380. PCE1 may then compute a temporary optimal path from node A to each of the two exit or egress boundary nodes F and I of the first domain 320. The two paths may comprise a first path crossing the nodes A, C, and F and a second path crossing the nodes A, C, G, and I, which are shown as solid arrow lines in FIG. 3. The first path and the second path may have associated costs of about two and about three, respectively. The two paths may be added into the candidate path list and ordered based on the path cost. The first path, which has the minimum cost of about two, may be selected from the candidate path list and added into the result path list. The path may be extended to connect the boundary node F to the entry or ingress boundary node J in the second domain 350. Accordingly, the extended path may have an increased cost of about three and added into the candidate path list. The second path, which has the minimum cost of about three in the candidate path list, may be selected from the candidate path list and added into the result path list. The path may be extended to connect the boundary node I to the entry boundary nodes K and A2 in the second domain 350 and the fourth domain 390, respectively. The two resulting paths may have associated costs of about four and 11. The increase in cost of the extended path may be due to the inter-domain link that connects the boundary nodes. For example, the inter-domain link that connects the boundary nodes I and A2 may have a cost of about eight. The resulting two extended temporary optimal paths and their costs may then be added to the candidate path list. The temporary optimal paths may also be ordered in the candidate path list based on their cost. PCE1 may then select the path with the minimum cost from the candidate path list (e.g., the path crossing the nodes A, C, F, and J) and add the selected path to the result path list.

Next, PCE1 may send a request to PCE2 to compute the path for the P2P LSP from the source node A to the destination node C1. The path from node A to node J has the minimum cost of about three. PCE2 may then compute three paths from the entry or ingress boundary node J of the second domain 350 to the three exit or egress boundary nodes O, S, and T, combine the path from node A to J with these three paths and have three paths from node A to O, to S, and to T, which may have associated costs of about five, six, and six, respectively. The candidate path list is updated with these three paths. The path from node A to K has the minimum cost of about four in the updated candidate path list, which may be selected by PCE2 and added into the result path list. PCE2 may compute a fourth path from the entry or ingress boundary node K of the second domain 350 to the exit or egress boundary node T, combine the path from node K to T with the path from node A to K and have a path from node A to T, which may have an associated cost of about six. The fourth paths may comprise the path crossing the nodes N and T. The fourth paths are shown as dashed arrow lines in FIG. 3.

The candidate path list may be updated with the path from node A to T via K. PCE2 may also compute a fifth path, a sixth path from node K to O and S respectively. The path from node A to O consisting of the path from node A to K and the fifth path (from node K to O) may have higher cost than the corresponding path in the candidate path list. The path from node A to T consisting of the path from node A to K and the sixth path (from node K to S) may have higher cost than the corresponding path in the candidate path list. The candidate path list may not be changed. The path from node A to O has the minimum cost of about five in the candidate path list, which may be selected by PCE2 and put into the result path list. The path may also be extended to connect the exit boundary node O in the second domain 350 to the entry boundary node A3 in the fifth domain 395 with an increased cost of about 15, and to the entry boundary node U in the third domain 380, with increased costs of about six. The candidate path list may be updated accordingly. The paths from node A to S and T have the minimum cost of about six in the updated candidate path list, which may be selected by PCE2 and put into the result path list. The paths may also be extended to connect the exit boundary nodes S and T in the second domain 350 to the entry boundary nodes V and W respectively in the third domain 380, with increased costs of about seven. The path from node A to T may also be extended to connect the boundary node T to the entry boundary nodes A4 in the sixth domain 399, with increased costs of about 16. The candidate path list may be updated accordingly. The paths in the candidate path list may be ordered according to the costs of the combined paths and the minimum cost path (e.g., the path crossing the nodes A, C, F, J, L, O, and U with cost of about 6) may be in the head of the list.

The path from node A to node U in the third domain 380 has the minimum cost of about six in the candidate list, which may be selected and put into the result path list. Subsequently, PCE2 may send a request to PCE3 associated with the third domain 380 to compute the path for the P2P LSP from the source node A to the destination node C1 in the third domain 380. PCE3 may extend node U in the third destination domain 380 to node X in the same domain with increased cost of about 7. The candidate path list may be updated according to the path from node A to node X via node U with cost of about 7. The three paths from node A to X, to V, and to W in the candidate path list have the minimum cost of about 7 after candidate path list is updated, and may be selected and put into the result path list. In the destination domain 380, PCE3 may then extend the path with tail-end node X to Z and A1 with increased cost of about 8 for the path from node A to Z via X and the path from node A to A1 via X, extend the path with tail-end node V to Y with increased cost of about 8 for the path from node A to Y via V, and extend the path with tail-end node W to B1 with increased cost of 8 for the path from node A to B1 via W. The candidate path list may be updated according to these four paths. The four paths from node A to Z, A1, Y and B1 (i.e., a first path from A to Z, a second path from A to A1, a third path from A to Y and a fourth path from A to B1) have the minimum cost of about 8 in the candidate path list, which may be selected and put into the result path list.

PCE3 may extend the path with tail-end node Z to C3 in the domain 395 with increased cost of about 18 for the path from node A to C3 via Z, extend the path with tail-end node A1 to C1 with increased cost of about 9 for the path from node A to C1 via A1, extend the path with tail-end node B1 to C4 in the domain 399 with increased cost of about 18 for the path from node A to C4 via B1. The candidate path list may be updated according to these tree extended paths. The path from node A to C1 (i.e., the path comprising the nodes A, C, F, J, L, O, U, X, A1 and C1) has the minimum cost of about 9 in the updated candidate path list, and may be selected and put into the result path list. Since the minimum cost path connects the source node A to the destination node C1, the path may be returned in a reply from PCE3, e.g., via PGE2 and PGE1, to the PCC 316 as the final optimal path for the P2P LSP. The FSPC procedure may then be completed.

In an embodiment of the FSPC procedure for computing an optimal path for a MPLS TE P2P LSP from a source node to a destination node crossing a plurality of domains, a current PCE that handles path computation in a current domain (e.g., at any time during the FSPC procedure) may be referred to as a CurrentPCE. A candidate path list referred to as a CandidatePathList may comprise the temporary optimal paths from the source node to the boundary nodes of the current domain or the nodes in the destination domain currently found. Each path in the CandidatePathList may be associated with an explicit route object (ERO) for the path, one or more attributes with a cost for the path, a PCE responsible for the tail-end node (edge node) of the path, one or more flags for the tail-end node of the path, or combinations thereof.

The flags may comprise about a one-bit destination (D) flag, about a one-bit source (S) flag, about a one-bit exit (E) flag, about a one-bit entry or ingress (I) flag, and/or about a one-bit node (N) flag. The D flag may be set (e.g., to about one) to indicate that the tail-end node is a destination node. The S flag may be set (e.g., to about one) to indicate that the tail-end node is the source node. The E flag may be set (e.g., to about one) to indicate that the tail-end node is an exit or egress boundary node. The I flag may be set (e.g., to about one) to indicate that the tail-end node is an entry or ingress boundary node. The N flag may be set (e.g., to about one) to indicate that the tail-end node is a node in the destination domain.

The paths in the CandidatePathList may be ordered by the path costs. Initially, the CandidatePathList may comprise only a special or initial path with an ERO that indicates a source node, one or more path attributes with a path cost of about zero, a PCE responsible for the source domain, one or more flags with the S bit set, or combinations thereof. Further, a result path list or tree referred to as a ResultPathList may comprise the final optimal path(s) from the source node to the boundary nodes or the nodes in the destination domain. Initially, the ResultPathList may be empty.

This FSPC procedure for computing the path for the MPLS TE P2P LSP may comprise the following steps. Initially, a PCC may set the ResultPathList to empty and the CandidatePathList to include the special or initial path described above. The PCC may send the PCE responsible for the source domain a request comprising the source node, the destination node, the CandidatePathList, and the ResultPathList. When the PCE responsible for a current domain receives a request for computing the path for the MPLS TE P2P LSP, the PCE may remove the path with the minimum cost from the CandidatePathList and put or graft the path to the ResultPathList. If a currently computed path, which may be referred to herein as a working path, has an ERO, one or more attributes, a PCE, and one or more flags, the CurrentPCE may be set to the PCE of the working path. The working path may be processed according to the following steps.

If the D flag or bit in the flags is set, then the optimal path from the source node to the destination node may be found, which may be in the result path list. Thus, a reply with the optimal path may be sent to the PCE or the PCC that sends the latest request to the PCE responsible for the current domain. If the N flag or bit in the flags is set, then new paths may be generated by adding each link connected to the tail-end node of the working path to the ERO or replacing the ERO in the working path with a new ERO for the link added. For each new path, the cost of the path may be the sum of the link cost and the cost of the working path, which may be represented in the attributes of the new path. The PCE for the new path may be the PCE for the working path if the tail-end node of the new path is in the same domain as the tail-end node of the working path. Otherwise, the PCE for the new path may be the PCE responsible for the domain containing the tail-end node of the new path. If the tail-end node of the new path is the destination node, then the D flag or bit in the flags of the new path may be set. Otherwise, the N flag or bit in the flags of the new path may be set if the tail-end node of the new path is in the destination domain. Otherwise, the I flag or bit in the flags of the new path may be set if the tail-end node of the new path is not in the destination domain.

Each of the new paths may be merged into the CandidatePathList as follows. The new path may be added into the CandidatePathList if the path's tail-end node is not a tail-end node of any other path in the CandidatePathList. Otherwise, if the cost of the new path is less than about the cost of the path with the same tail-end node in CandidatePathList, then the path in the CandidatePathList may be replaced with the new path.

If the I flag or the S flag is set, then path segments from the tail-end node of the working path to each exit boundary node of the current domain may be computed. New paths may be generated through adding each path segment connected to the tail-end node of the working path. For each new path, the cost of the new path may be the sum of the path segment cost and the cost of the working path. The PCE for the new path may be set as the PCE for the working path. The E flag or bit in the flags of the new path may be set. Other bits in the flags may be set according to the position of the tail-end node of the new path. If the tail-end node is an entry boundary node, such as an Area Border Router (ABR), then the I flag or bit in the flags of the new path may be set. If the tail-end node is in the destination domain, then the N flag or bit may be set. If the tail-end node is the destination node, then the D flag or bit may be set. Each of the new paths may be merged into the CandidatePathList.

If the E flag or bit is set and there exists an inter-domain link connected to the tail-end node of the path, then new paths may be generated by adding each inter-domain link connected to the tail-end node (e.g., an exit boundary node) of the path to the ERO or replacing the ERO in the working path with a new ERO for the link added. For each new path, the cost of the new path may be the sum of the link cost and the cost of the working path. The PCE for the new path may be the one responsible for the tail-end node (e.g., an entry boundary node) of the new path. The I flag in the flags of the new path may be set. Other bits or flags in the flags may be set according to the position of the tail-end node of the new path. If the tail-end node is in the destination domain, then the N flag may be set. If the tail-end node is the destination node, then the D flag may be set. Each of the new paths may be merged into the CandidatePathList.

The path with the minimum cost in the CandidatePathList may be removed from the CandidatePathList, and put or grafted to the ResultPathList as a working path. If the CurrentPCE is the same as the PCE of the working path, the above steps may be repeated. Otherwise, the CurrentPCE may send the PCE of the working path a request with the source node, the destination node, the CandidatePathList, and the ResultPathList.

Figure 4:
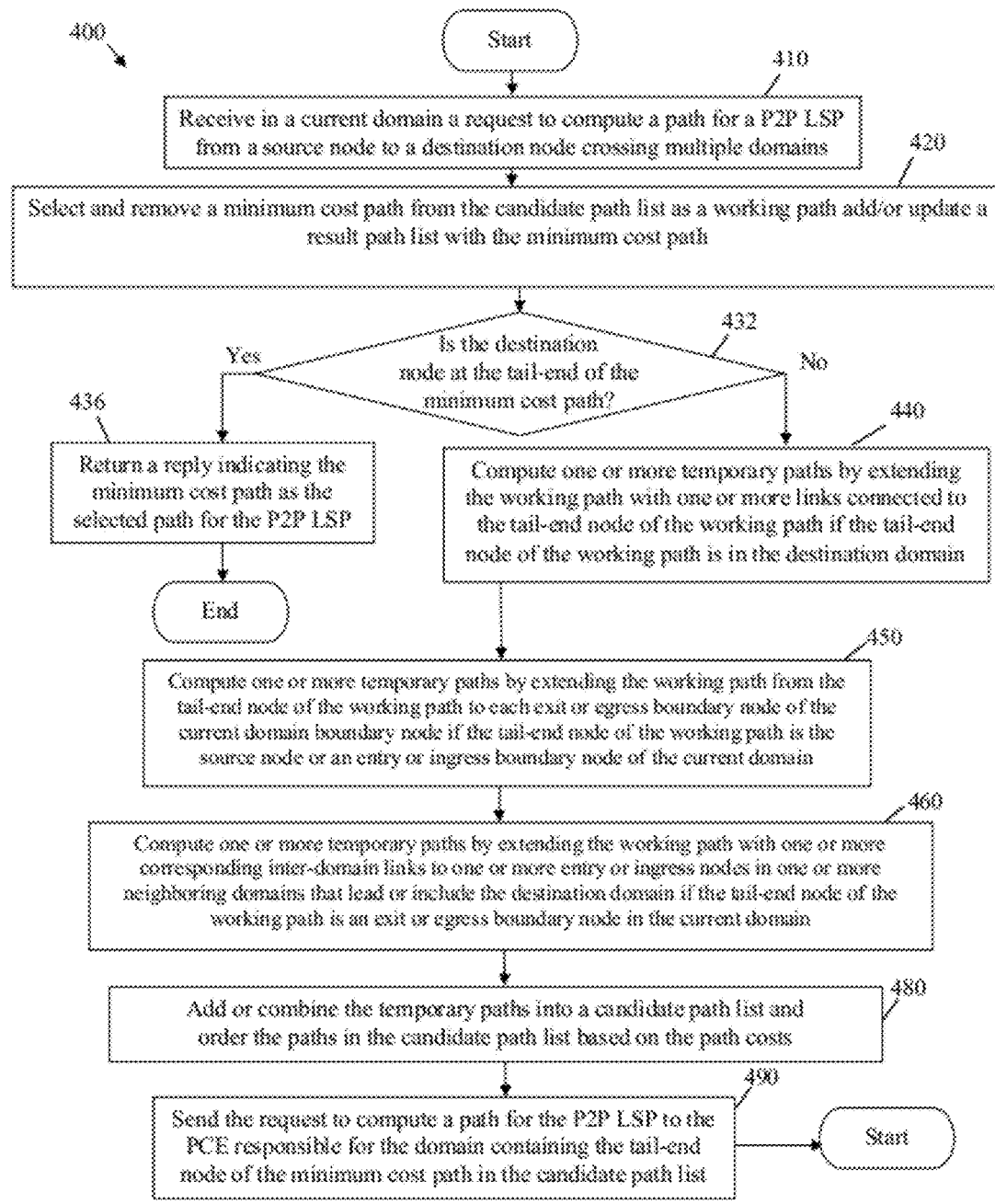
FIG. 4 is a flowchart of an embodiment of a FSPC method.

FIG. 4 illustrates an embodiment of a FSPC method 400, which may be implemented as part of the FSPC procedure or schemes above. The FSPC method 400 may be implemented by one or more PCEs in a network or label switch system comprising multiple domains to compute a path for a P2P LSP from a source node to a destination node crossing the domains. The FSPC method 400 may start at block 410, where a current domain may receive a request to compute a path for a P2P LSP from a source node to a destination node crossing multiple domains. The request may be received from a PCC in a source domain or a PCE in an intermediate domain between the source domain and the destination domain.

At block 420, the method may select and remove a minimum cost path from the candidate path list as a working path, add/or update a result path list with the minimum cost path. The minimum cost path may be added to the result path list if the result path list is empty or if the result path list does not contain any path sharing a path segment or link with the minimum cost path. Alternatively, the result path list may be updated by combining a current path in the list and the minimum cost path from the candidate path list if the minimum cost path has common nodes and links with the current path. At block 432, the method may determine whether the destination node is at the tail-end of the minimum cost path. If the path's end-tail node is not the destination node, then the method 400 may proceed to block 440. Otherwise, the condition of block 432 may be satisfied where a final optimal path that reaches the destination node may be found and the method 400 may proceed to block 436. At block 436, a reply indicating the minimum cost path as the selected path for the P2P LSP may be returned, e.g., to the PCC of the source domain. The method 400 may then end and the FSPC procedure may also end.

At block 440, one or more temporary paths may be computed by extending the working path with one or more links connected to the tail-end node of the working path if the tail-end node of the working path is in the destination domain. The cost of each of the temporary paths may be calculated as the sum of the cost of the working path and the cost of the link extended to the working path. At block 450, one or more temporary paths may be computed by extending the working path from the tail-end node of the working path to each exit or egress boundary node of the current domain if the tail-end node of the working path is the source node or an entry or ingress boundary node of the current domain. The cost of each of the temporary paths may be calculated as the sum of the cost of the working path and the cost of the optimal path segment added to the working path. At block 460, one or more temporary paths may be computed by extending the working path with one or more corresponding inter-domain links to one or more entry or ingress boundary nodes in one or more neighboring domains that lead or include the destination domain if the tail-end node of the working path is an exit or egress boundary node in the current domain. The inter-domain links may connect the boundary nodes between the domains. The cost of each of the temporary paths may be calculated as the sum of the cost of the working path and the cost of the inter-domain link extended to the working path.

At block 480, the temporary paths may be added or combined into the candidate path list and ordered in the candidate path list based on the path updated costs. An extended temporary path may be added into the candidate path list if the candidate path list does not contain any path with the same tail-end node as the extended temporary path or contains the paths with the same tail-end node and the same cost as the extended temporary path. An extended temporary path may replace every path with the cost greater than the cost of the extended temporary path in the candidate path list. The paths in the candidate path list may be ordered based on the path costs.

At block 490, the request to compute a path for the P2P LSP may be sent to the PCE responsible for the domain containing the tail-end node of the minimum cost path in the candidate path list. The method 400 may then end for the current domain but the FSPC procedure may not yet end. The request may be sent to one or more PCEs associated with the one or more neighboring domains. Hence, each PCE that receives the request may implement the method 400 in a corresponding domain, which may then become the current domain. The PCEs may update the temporary paths in the corresponding domains in turn based on the previously computed temporary paths by the other PCEs in the other domains. The PCEs or the network may also coordinate the processes of the different PCEs to avoid loops in the FSPC procedure.

When a final optimal path is computed successfully, the reply message sent to the PCC may comprise the computed optimal path and one or more reply flags. One of the reply flags may be set to indicate that that the requested path is computed using FSPC. In an embodiment, if the FSPC procedure fails to compute a final optimal P2P path from the source node to the destination node, e.g., at any point during the procedure, a reply indicating a failure may be returned to the PCC of the source domain. For instance, if all domains in the network, e.g., neighboring domains or domains coupled to the source and destination domains are processed (e.g., by corresponding PCEs) and the final optimal path (in the result path list) does not comprise the destination node at the tail-end, then any of the PCEs, such as the PCE of the destination domain, may return a failure message to the PCC. The reply message may indicate a reason for failure to compute a path for the LSP. The reply message may comprise a PCEP-ERROR object that comprises an Error-Type field and an Error-Value field, which may be each assigned one of a plurality of different values to indicate one of a plurality of different causes for the failure. Additionally or alternatively, the reply message may comprise a NO-PATH object that includes a flag, which may be set to indicate the reason of the failure, and detail information about the failure.

As described above, the PCC and one or more of the PCEs in the system and schemes above may communicate using one or more request and reply messages. Additionally, the PCC and PCEs may communicate using one or more session establishment messages, e.g., prior to or upon starting the FSPC procedure. A PCE may send a session establishment message to the PCC, which may comprise one or more capability flags. The capability flags may be used to indicate that the PCE is configured to compute an optimal path from a source node to a destination for a TE LSP crossing multiple domains using FSPC. The PCC may send a request message to a PCE that comprises one or more request flags. The request flags may be used to indicate that the PCC is requesting from a PCE to compute an optimal path for a TE LSP crossing multiple domains using FSPC.

Figure 5:
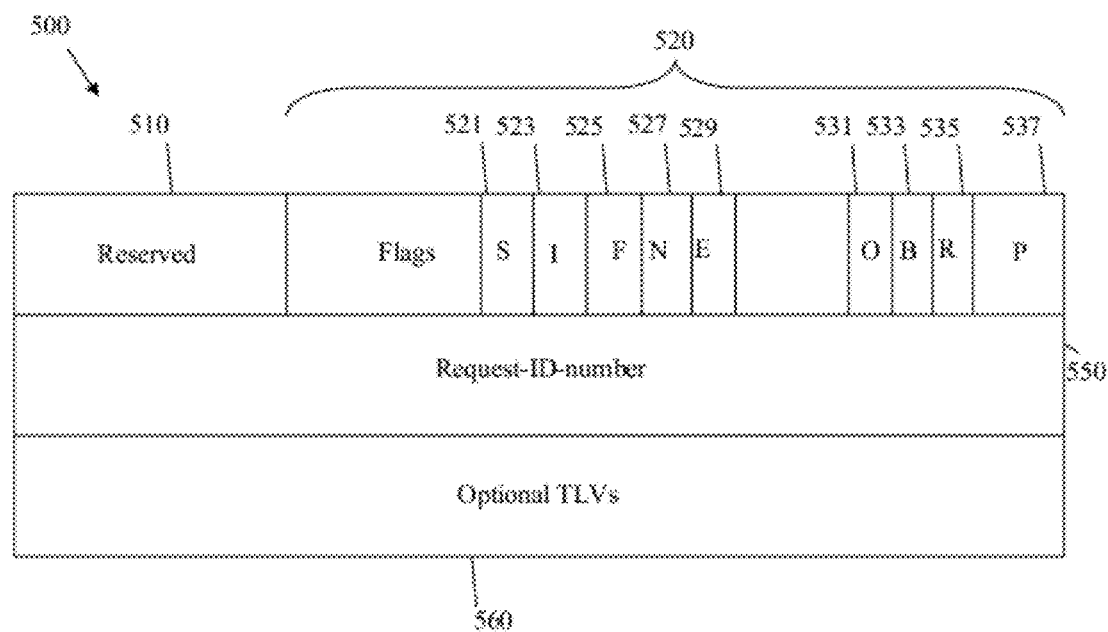
FIG. 5 is a schematic diagram of an embodiment of a request/reply (RP) object.

FIG. 5 illustrates an embodiment of a RP object 500, which may be part of a request message transmitted from a PCC to a PCE to request computing a path for a P2P LSP crossing multiple domains. The RP object 500 may also be part of a reply message transmitted from a PCE to a PCC to indicate a selected final optimal path crossing the multiple domains, which may be computed using the FSPC procedure. The RP object 500 may comprise a Reserved field 510, a plurality of Flags 520, and a request identifier (Request-ID-number) field 550. Additionally, the RP object 500 may comprise at least one optional type-length-value (TLV) 560. The Flags 520 may comprise a FSPC bit (S) flag 521, a Backup Ingress bit (I) flag 523, a Fragmentation bit (F) flag 525, a P2MP bit (N) flag 527, an ERO compression bit (E) flag 529, a Strict/Loose bit (O) flag 531, a Bi-directional bit (B) flag 533, a Re-optimization (R) flag 535, and a plurality of Priority bit (P) flags 537. The Flags 520 may also comprise additional bits, which may be unassigned or reserved. For instance, the remaining bits may be set to about zero and ignored.

In an embodiment, the Request-ID-number field 550 may have a length of about 32 bits and the Reserved field 510 may have a length of about eight bits. Each of the S flag 521, I flag 523, F flag 525, N flag 527, E flag 529, O flag 531, B flag 533, and R flag 535 may have a length of about one bit. The P flags 537 may have a combined length of about three bits. The Reserved field 510 may not be used and may be ignored and/or may be reserved for other purposes. The Request-ID-number 550 may be combined with the source IP address of the PCC or PCE network address to identify the path computation request context. The Request-ID-number 550 may be changed or incremented each time a new request is sent to the PCE. The optional type-TLV 560 may be used to indicate path computation capabilities, path constraints, other path information, or combinations thereof.

The S flag 521 may be set (e.g., to about one) to indicate whether the request or reply message is related to a FSPC for a MPLS TE LSP path. The I flag 523 may be set (e.g., to about one) to indicate a backup ingress computation for a MPLS TE LSP. The O flag 531 may be set in a request message to indicate that a loose path is acceptable or may be cleared to indicate that a path comprising exclusively strict hops is required. The O flag 531 may be set in a reply message to indicate that the computed path is loose or may be cleared to indicate that the computed path comprises strict hops. The P flags 537 may be used to specify a recommended request priority. For instance, the P flags 537 may indicate a value from about one to about seven, which may be set locally at the PCC. Alternatively, the P flags 537 may be set to about zero when the request priority is not specified. The F flag 525, N flag 527, E flag 529, B flag 533, and R flag 535 may be configured based on the PCEP.

In some embodiments, the S flag 521 with the N flag 527 may be used to indicate whether the request/reply is for FSPC of a MPLS TE P2MP LSP or a MPLS TE P2P LSP path. For instance, both the S flag 521 and the N flag 527 may be set to about out one to indicate a request/reply message for FSPC of a MPLS TE P2MP LSP path. Alternatively, the S flag 521 may be set to about one and the N flag 527 may be set to about zero to indicate a request/reply message for FSPC of a MPLS TE P2P LSP path.

Figure 6:
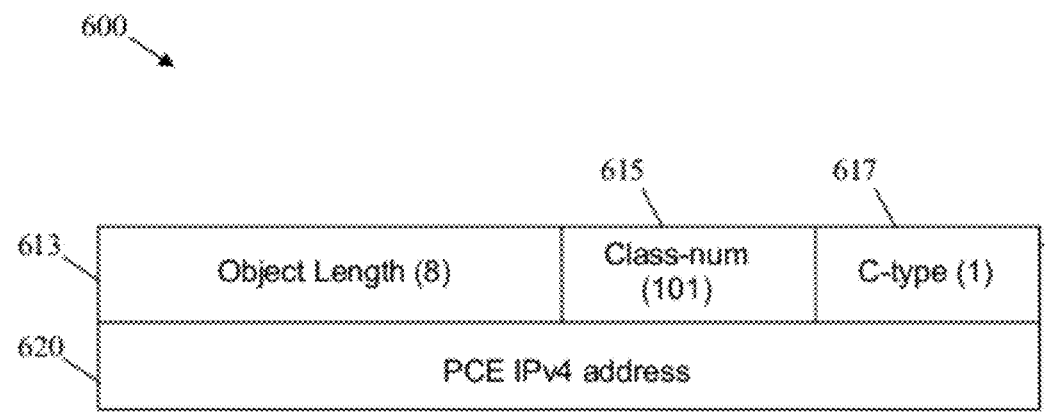
FIG. 6 is a schematic diagram of an embodiment of a PCE Internet Protocol (IP) version 4 (IPv4) object.

FIG. 6 illustrates an embodiment of a PCE IPv4 object 600, which may be sent by a PCE to a PCC to announce the PCE and/or indicate the PCE's address. The PCE IPv4 object 600 may be sent prior to starting the FSPC procedure and may allow the PCC to send a request to the PCE. The PCE Internet Protocol version 4 (IPv4) object 600 may comprise an Object Length field 613, a Class number (Class-num) field 615, a C-type field 617, and a PCE IPv4 address field 620. The Object Length field 613 may comprise a value (e.g., of about eight) that indicates the length of the object in bytes. The Class-num field 615 may comprise a value (e.g., of about 101), which may be assigned by the Internet Assigned Numbers Authority (IANA). The C-type field 617 may comprise another value (e.g., of about one), which may also be assigned by IANA. The PCE IPv4 address field 620 may comprise an IPv4 address of a PCE with which a PCE session may be established and to which a request message may be sent.

Figure 7:
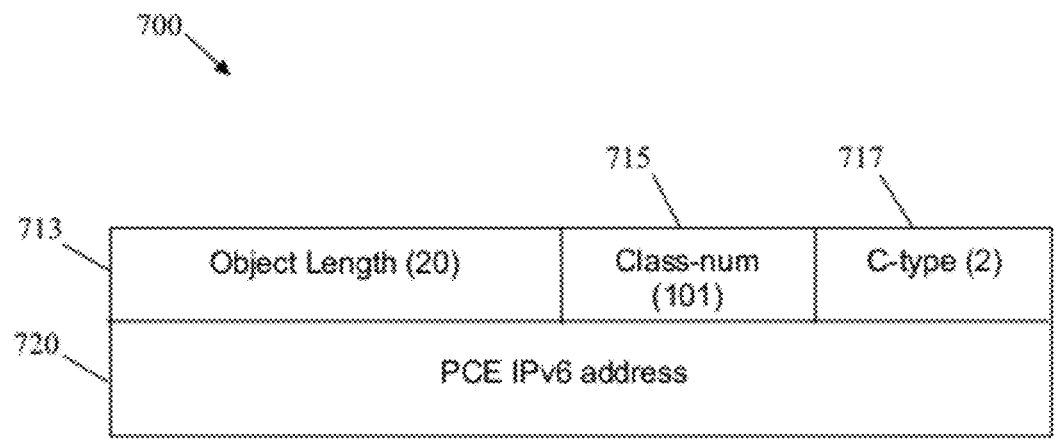
FIG. 7 is a schematic diagram of an embodiment of a PCE IP version 6 (IPv6) object.

FIG. 7 illustrates an embodiment of a PCE IPv6 object 700, which also may be sent by a PCE to announce the PCE and/or indicate the PCE's address. The PCE IPv6 object 700 may be sent prior to starting the FSPC procedure and may allow the PCC to send a request to the PCE. The PCE IPv6 object 700 may comprise an Object Length field 713, a Classnum field 715, a C-type field 717, and a PCE IPv6 address field 720. The Object Length field 713 may comprise a value (e.g., of about 20) that indicates the length of the object in bytes. The Class-num field 715 may comprise a value (e.g., of about 101), which may be assigned by the Internet Assigned Numbers Authority (IANA). The C-type field 717 may comprise another value (e.g., of about two), which may also be assigned by IANA. The PCE IPv6 address field 620 may comprise an IPv6 address of a PCE with which a PCE session may be established and to which a request message may be sent.

Figure 8:
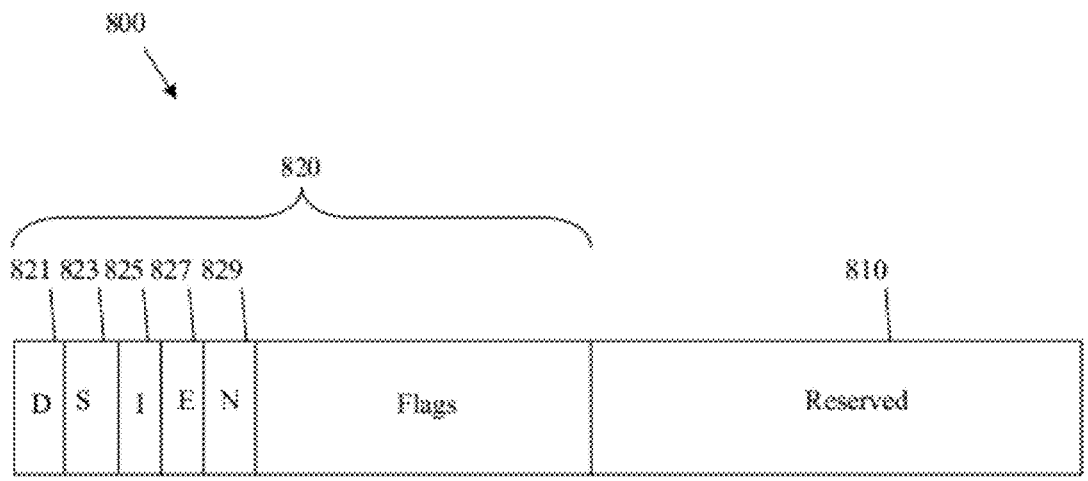
FIG. 8 is a schematic diagram of an embodiment of a Node-Flags object.

In an embodiment, one or more tail-end nodes of the temporary optimal paths in the candidate path list may be associated with a node flags object that comprises a plurality of flags. FIG. 8 illustrates an embodiment of a Node-Flags object 800, which may be part of a request message transmitted from a PCC to a PCE or part of a reply message transmitted from a PCE to a PCC, e.g., during the FSPC procedure. The Node-Flags object 800 may indicate the characteristics of the tail-end node of a path in a candidate path list in a request or reply message for FSPC. The Node-Flags object 800 may comprise a Reserved field 810 and a plurality of Flags 820. The Flags 820 may comprise a Destination node bit (D) flag 821, a Source node bit (S) flag 823, an Incoming/entry boundary node bit (I) flag 825, an Exit boundary node (E) flag 827, and a Node in a destination domain bit (N) flag 829. The Flags 820 may also comprise additional bits, which may be unassigned or reserved. For instance, the remaining bits may be set to about zero and ignored.

In an embodiment, the Reserved field 810 may have a length of about twenty seven bits and each of the D flag 821, S flag 823, I flag 825, E flag 827, and N flag 829 may have a length of about one bit. The D flag 821 may be set (e.g., to about one) to indicate that the tail-end node of a path is a destination node. The S flag 823 may be set (e.g., to about one) to indicate that the tail-end node of a path is a source node. The I flag 825 may be set (e.g., to about one) to indicate that the tail-end node of a path is an entry boundary node. The E flag 827 may be set (e.g., to about one) to indicate that the tail-end node of a path is an exit boundary node. The N flag 829 may be set (e.g., to about one) to indicate that the tail-end node of a path is a node in a destination domain.

Figure 9:
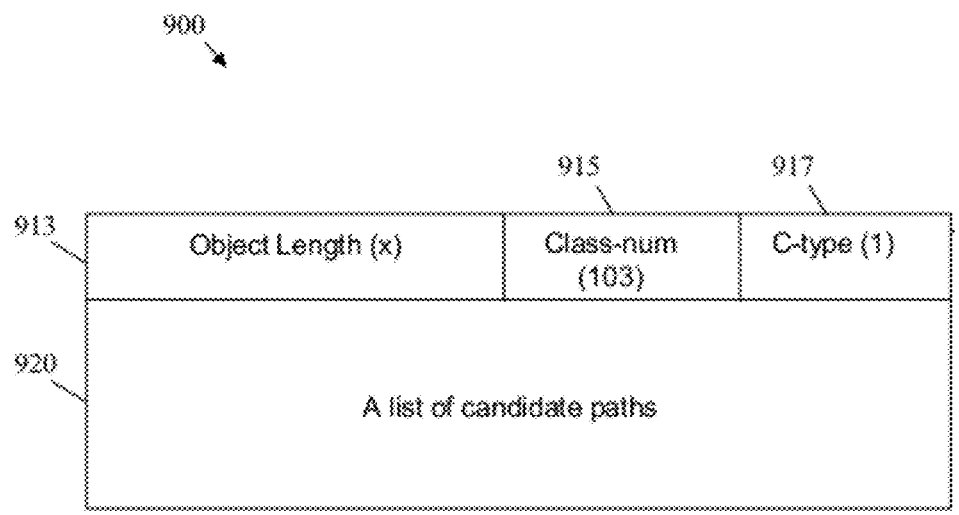
FIG. 9 is a schematic diagram of an embodiment of a candidate path list object.

FIG. 9 illustrates an embodiment of a candidate path list object 900, which may be sent in a message to exchange a candidate path list information, e.g., between the PCEs and the PCC. The candidate path list object 900 may comprise an Object Length field 913, a Class-num field 915, a C-type filed 917, and a list of candidate paths field 920. The Object Length field 913 may comprise a value (e.g., an integer x), which may indicate a length of the object in bytes and may vary depending on the remaining elements of the candidate path list object 900, such as the length of the list of candidate paths field 920. The Class-num field 915 may comprise a value (e.g., of about 103), which may be assigned by IANA. The C-type field may comprise another value (e.g., of about one), which may also be assigned by IANA. The list of candidate paths field 920 may comprise a list of candidate paths, which may be computed during the FSPC. Each path in the list of candidate paths may represent a path from the source node to a tail-end node, which may be an intermediate node of an optimal path to the destination node or may be the destination node. Each path may have the same or similar format defined in RFC 5440, which is incorporated herein by reference.

In an embodiment, the candidate path list may have the following format, which may comprise one or more candidate paths:

```
<candidate-path-list>::=<candidate-path>
                        [<candidate-path-list>]
<candidate-path>::= <ERO>
                    <candidate-attribute-list>
<candidate-attribute-list>::=[<attribute-list>]
                    [<PCE>]
                    [<Node-Flags>].
```

A candidate path in the candidate path list may comprise an ERO, e.g., as described above, and a candidate attribute list. The candidate path may have a tail-end node indicated in the ERO. The ERO in the candidate path may comprise the path segment consisting, for example only, of the last link of the path, which may extend from the previous hop node of the tail-end node to the tail-end node. With this information, the candidate path may be added or grafted into the current result path list or tree.

In an embodiment, a path computation request message that comprises an extension of a result path list and a candidate path list may have the following format:

```
<PCReq Message>::= <Common Header>
                    [<svec-list>]
                    <request-list>
<request-list>::=<request>[<request-list>]
<request>::= <RP>
             <END-POINTS>
             [<OF>]
             [<LSPA>]
             [<BANDWIDTH>]
             [<metric-list>]
             [<RRO>[<BANDWIDTH>]]
             [<IRO>]
             [<LOAD-BALANCING>]
             [<result-path-list>]
             [<candidate-path-list-obj>]
    where:
<result-path-list>::=<path>
                     [<result-path-list>]
<path>::= <ERO>
          <attribute-list>
<attribute-list>::= [<LSPA>]
                    [<BANDWIDTH>]
                    [<metric-list>]
                    [<IRO>]
<candidate-path-list-obj> contains a <candidate-path-list>
<candidate-path-list>::=    <candidate-path>
                            [<candidate-path-list>]
<candidate-path>::=   <ERO>
                      <candidate-attribute-list>
<candidate-attribute-list>::=   [<attribute-list>]
                                [<PCE>]
                                [<Node-Flags>].
```

Figure 10:
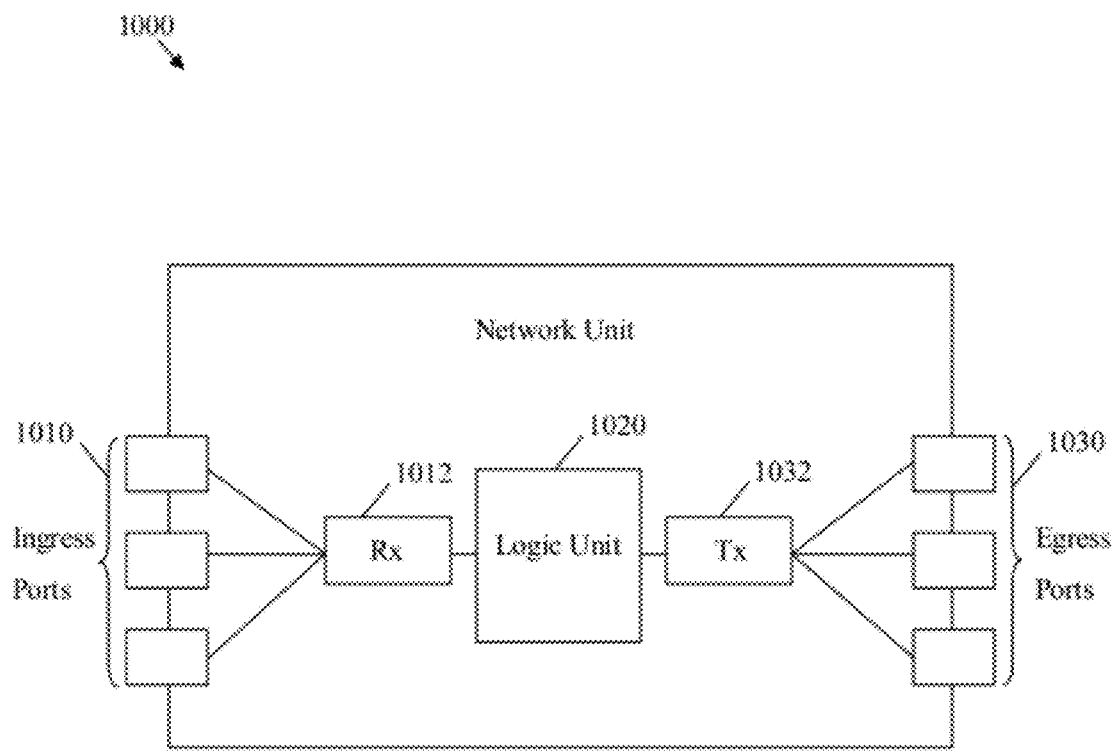
FIG. 10 is a schematic diagram of an embodiment of a network unit.

FIG. 10 illustrates an embodiment of a network unit 1000, which may be any device that transports packets through a network. For instance, the network unit 1000 may be located in any of the network components described above, e.g., in any one of the network nodes, the PCC, and/or the PCEs. The network unit 1000 may comprise one or more ingress ports or units 1010 coupled to a receiver (Rx) 1012 for receiving signals and frames/data from other network components. The network unit 1000 may comprise a logic unit 1020 to determine which network components to send data to. The logic unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, logic unit 1020, and transmitter 1032 may also implement or support the FSPC procedure, such as the FSPC schemes 200 and 300 and the FSPC method 400. The components of the network unit 1000 may be arranged as shown in FIG. 10.

Figure 11:
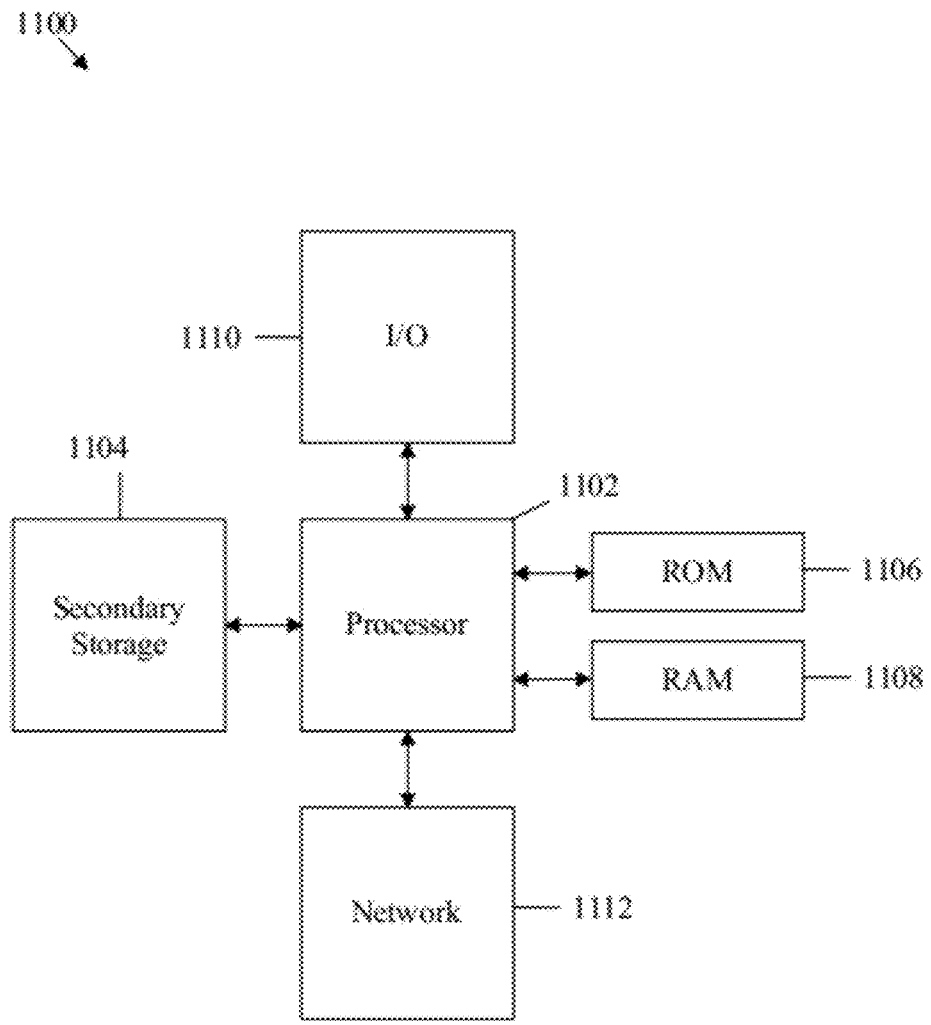
FIG. 11 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 11 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   a receiver configured to receive a request for computing a path from a source node in a source domain to a destination node in a destination domain coupled to the source domain and to receive a reply containing a path computation result;
   a logic unit configured to compute a plurality of temporary paths, update a candidate path list with the temporary paths, and update a result path list with a minimum cost path selected from the updated candidate path list; and
   a transmitter configured to send a message to complete the request for computing the path from the source node to the destination node and send a reply message to pass the path computation result,
   wherein a tail-end node of a path in the candidate path list is associated with a plurality of node flags, and wherein the node flags comprise a Destination node bit (D) flag that is used to indicate whether the tail-end node is a destination node, a Source node bit (S) that is used to indicate whether the tail-end node is a source node, an Incoming/entry boundary node bit (I) flag that is used to indicate whether the tail-end node is an entry boundary node, an Exit boundary node (E) flag that is used to indicate whether the tail-end node is an exit boundary node, and a Node in a destination domain bit (N) flag that is used to indicate whether the tail-end node is a node in a destination domain.

2. The network component of claim 1, wherein the request message is sent by a path computation client (PCC) in the source domain and comprises the candidate path list and the result path list that are both initialized, and wherein the initialized candidate path list is updated by adding the temporary optimal paths and the result path list is updated by adding minimum cost path selected from the candidate path list.

3. The network component of claim 1, wherein the reply message is sent by a path computation element (PCE) in the destination domain and indicates the minimum cost path and one or more reply flags, and wherein one of the reply flags is used to indicate whether the path from the source node to the destination node is computed using Forward Search Path Computation (FSPC).

4. The network component of claim 1, wherein the message is a reply message sent to a path computation client (PCC) in the source domain, wherein the reply message indicates the minimum cost path and one or more reply flags, and wherein one of the reply flags is used to indicate whether the path from the source node to the destination node is computed using Forward Search Path Computation (FSPC).

5. The network component of claim 1, wherein the message is a reply message sent to a path computation client (PCC) in the source domain, wherein the reply message comprises a reason for failure to compute the path from the source node to the destination node, and wherein the reason is indicated using a path computation element protocol (PCEP)-ERROR object in the reply message that comprise an Error-Type field and an Error-Value field which are each assigned one of a plurality of different values to indicate one of a plurality of different causes for the failure.

6. The network component of claim 1, wherein the message is a reply message sent to a path computation client (PCC) in the source domain, wherein the reply message comprises a NO-PATH object that includes a flag and detail information about the failure, and wherein the flag is set to a reason for failure to compute the path from the source node to the destination node.

7. A network component comprising:
a receiver configured to receive a request for computing a path from a source node in a source domain to a destination node in a destination domain coupled to the source domain and to receive a reply containing a path computation result;
a logic unit configured to compute a plurality of temporary paths, update a candidate path list with the temporary paths, and update a result path list with a minimum cost path selected from the updated candidate path list; and
a transmitter configured to send a message to complete the request for computing the path from the source node to the destination node and send a reply message to pass the path computation result,
wherein the request message is sent by a path computation element (PCE) in a second domain coupled to the current domain and comprises the candidate path list and the result path list, wherein the candidate path list is updated by adding a temporary optimal path to the candidate path list when the candidate path list does not contain a path having the same tail-end node as the temporary optimal path and the candidate path list is updated by replacing a current minimum cost path in the candidate path list by the minimum cost temporary path when the minimum cost temporary path has a lower cost than the current minimum cost path, and wherein a new request message is transmitted when the minimum cost path added into the result path list does not contain the destination and a reply message is transmitted to the PCE in the second domain when the minimum cost path added into the result path list contains the destination.

8. The network component of claim 7, wherein the new request message comprises the updated candidate path list and the updated result path list, and is transmitted to a PCE in a third domain coupled to the current domain when the tail-end node of the minimum cost path added into the result path list is not in the current domain, and wherein the third domain contains the tail-end node.

9. The network component of claim 7, wherein the new request message comprises the updated candidate path list and the updated result path list, and is transmitted to the PCE in the current domain when the tail-end node of the minimum cost path added into the result path list is in the destination domain and the current domain is the destination domain.

10. The network component of claim 9, wherein the new request message sent to the PCE in the current domain is omitted, and wherein the request message comprising updated candidate path list and the updated result path list is assumed received.

11. A method implemented by a path computation element (PCE) comprising:
receiving in a current domain a request to compute a path for a point-to-point (P2P) Label Switched Path (LSP) from a source node to a destination node crossing multiple domains that include the current domain;
attempting to compute, with at least one processor, one or more temporary paths in the current domain;
updating a candidate path list using the temporary paths when computed successfully;
updating a result path list with a minimum cost path selected from the candidate path list as a working path; and
returning a reply to respond to the request,
wherein the temporary paths in the current domain are computed by extending the working path with one or more links connected to the tail-end node of the working path when the tail-end node of the working path is in the destination domain, wherein the links are not in the result path list, and wherein the cost of a temporary path is the sum of the cost of the working path and the cost of the link connected to the tail-end node of the working path.

12. The method implemented by the PCE of claim 11, wherein the temporary paths in the current domain are computed from the source node or one or more entry or ingress boundary nodes to each exit or egress boundary node and/or the destination node in the current domain.

13. The method implemented by the PCE of claim 11 further comprising forwarding the request to compute the path for the P2P LSP to one or more neighboring domains coupled to the current domain and leading to the destination domain when one or more tail-end nodes of one or more corresponding minimum cost paths selected from the candidate path list are in one or more neighboring domains.

14. The method implemented by the PCE of claim 11, wherein the candidate path list is updated by adding a temporary path into the list when the list does not contain any path with the same tail-end node as the temporary path.

15. The method implemented by the PCE of claim 11, wherein the candidate path list is updated by replacing a path in the list with a temporary path when the path in the list has the cost greater than the cost of the temporary path.

16. The method implemented by the PCE of claim 11, wherein a reply message is sent to the PCE or PCC from which the request message is received and indicates the minimum cost path as the selected path for the P2P LSP when the tail-end node of the working path is the destination node.

17. The method implemented by the PCE of claim 11, wherein a reply message is sent to the PCE or PCC from which the request message is received and indicates a failure for computing a path for the P2P LSP when a temporary path from the working path cannot be computed.

18. The method implemented by the PCE of claim 11, wherein a reply message is sent or passed to the PCE or PCC from which the request message is received when a second reply message is received from a second PCE in a second domain coupled to the current domain, and wherein the second reply message responds to a request message sent to the second PCE by the current PCE.

19. The method implemented by the PCE of claim 11, wherein attempting to compute the path for the P2P LSP from the source node to the destination node starts at a PCE responsible for a source domain that comprises the source node.

20. The method implemented by the PCE of claim 11, wherein attempting to compute the path for the P2P LSP from the source node to the destination node starts using a candidate path list and a result path list that are initialized, wherein the initialized candidate path list is associated with an initial explicit route object (ERO) value of a special path with a source node, a path attribute with a path cost of about zero, a PCE responsible for the source domain, and one or more flags including a one-bit source (S) flag that is set, and wherein the initialized result path list is empty.

21. The method implemented by the PCE of claim 11, wherein a path in the candidate path list is associated with an explicit route object (ERO), one or more attributes, a PCE, and one or more Node Flags.

22. A method implemented by a path computation element (PCE) comprising:
   receiving in a current domain a request to compute a path for a point-to-point (P2P) Label Switched Path (LSP) from a source node to a destination node crossing multiple domains that include the current domain;
   attempting to compute, with at least one processor, one or more temporary paths in the current domain;
   updating a candidate path list using the temporary paths when computed successfully;
   updating a result path list with a minimum cost path selected from the candidate path list as a working path; and
   returning a reply to respond to the request,
   wherein the temporary paths in the current domain are computed by calculating a best path segment from the tail-end node of the working path to each exit or egress boundary node of the current domain and extending the working path to the exit or egress boundary node via the best path segment when the tail-end node is the source node or an entry or ingress boundary node of the current domain, wherein the exit or egress boundary node is not in the result path list, and wherein the cost of a temporary path is the sum of the cost of the working path and the cost of the best path segment extended to the tail-end node of the working path.

23. A method implemented by a path computation element (PCE) comprising:
   receiving in a current domain a request to compute a path for a point-to-point (P2P) Label Switched Path (LSP) from a source node to a destination node crossing multiple domains that include the current domain;
   attempting to compute, with at least one processor, one or more temporary paths in the current domain;
   updating a candidate path list using the temporary paths when computed successfully;
   updating a result path list with a minimum cost path selected from the candidate path list as a working path; and
   returning a reply to respond to the request,
   wherein the temporary paths in the current domain are computed by extending the working path with one or more corresponding inter-domain links to one or more entry or ingress nodes in one or more neighboring domains that lead or include the destination domain when the tail-end node of the working path is an exit or egress boundary node in the current domain, wherein the inter-domain links are not in the result path list, and wherein the cost of a temporary path is the sum of the cost of the working path and the cost of the inter-domain link connected to the tail-end node of the working path.

* * * * *